United States Patent [19]

Chisholm et al.

[11] Patent Number: 4,728,238

[45] Date of Patent: Mar. 1, 1988

[54] PLASTIC DRIVE FASTENER

[75] Inventors: Lisa E. Chisholm, Chicago Heights; John F. Nelson, New Lenox, both of Ill.

[73] Assignee: Illinois Tool Works Inc., Chicago, Ill.

[21] Appl. No.: 403,385

[22] Filed: Jul. 30, 1982

Related U.S. Application Data

[63] Continuation of Ser. No. 159,899, Jun. 16, 1980, abandoned.

[51] Int. Cl.⁴ ............................................. F16B 19/00
[52] U.S. Cl. .................................... 411/510; 411/456; 411/913
[58] Field of Search ............... 411/508, 509, 510, 455, 411/456, 913; 24/305, 350, 213 R, 214

[56] References Cited

U.S. PATENT DOCUMENTS

| | | | |
|---|---|---|---|
| 1,264,683 | 4/1918 | Ricci | 411/455 |
| 1,373,875 | 4/1921 | Fallon | 411/455 |
| 1,971,726 | 8/1934 | Norwood | 411/510 X |
| 3,483,787 | 12/1969 | Saunders | 411/510 |
| 3,810,279 | 5/1979 | Swick et al. | 411/509 |
| 4,270,328 | 6/1981 | Page et al. | 24/213 R |
| 4,287,657 | 9/1981 | Andre et al. | 24/213 R X |

*Primary Examiner*—Neill Wilson
*Attorney, Agent, or Firm*—J. P. O'Brien; T. W. Buckman

[57] ABSTRACT

An improved one piece drive fastener having a head and a shank, the shank including a generally non-circular cross-section presenting a plurality of generally flat, axially extending surfaces. Each of the flat surfaces on the shank carry a plurality of axially spaced flexible resilient wing elements; the wings being flexed along the straight line connection with the flat surfaces. Certain wings extending from and positioned in spaced relation along at least one said surfaces being angularly disposed so as to tilt in the direction of said head and further including means formed integrally with each of said certain wings to substantially increase the force required for removal of said fastener from a cooperating aperture as compared to the force required to introduce said fastener into said aperture. Said fastener with its flat surfaces permitting the manufacture of said fastener in a simple two-plate mold design.

3 Claims, 10 Drawing Figures

PLASTIC DRIVE FASTENER

This is a continuation of application Ser. No. 159,899, filed June 16, 1980, now abandoned.

BACKGROUND OF THE INVENTION

Plastic drive fasteners of various configurations are found in the art classified within the U.S. Patent Office as classes 24/73 and 85/5; more particularly particular reference should be made to the patent to Edwin Grant Swick, U.S. Pat. No. 3,810,279 issued May 14, 1974 and assigned to the common assignee of the present invention. Such fasteners while suitable for many applications have a single inherent problem, namely, the insertion force for installing the fastener in an aperture or bore of a work piece is substantially equal to the force required for removal of the fastener from such an aperture or bore. In some applications it has been found desirable to provide a fastener which can be readily installed but which requires an excessive amount of force to remove same.

SUMMARY OF THE INVENTION

The present invention is an improvement over the teachings of U.S. Pat. No. 3,810,279 and provides a fastener in which there is provided a one piece member having a head and a shank, the shank including a generally non-circular cross-section which presents a plurality of generally flat axially extending surfaces. Each of the flat surfaces on the shank carry a plurality of axially spaced flexible resilient wing elements; the wings being flexed along their straight line connection with the flat surfaces. Certain wings located on at least one said surfaces being angled to tilt towards said head and being provided with means for substantially increasing the force required for removal of said fastener from an aperture or bore as compared to the force required to introduce said fastener into said aperture.

An object of the present invention is to provide a fastener of the type generally described immediately above.

Another object of the present invention is to provide a fastener having angled wing elements which are knuckled wherein each wing element is provided with an angularly disposed reinforcing portion on its upper surface which causes said wing elements to flex generally parallel to the flat surface but at a point radially removed therefrom.

A further object of the present invention is to provide an economical fastener which can be readily molded in a two-plate mold.

Still another object of the present invention is to provide a fastener capable of being utilized with multiplicity of head styles as well as a plurality of differing designs of entry or nose configurations.

Other objects will be apparent to those skilled in the art when the specification is read in conjunction with the following drawings.

DETAILED DESCRIPTION

A plastic drive fastener of the improved variety contemplated by the present invention is generally designated by the numeral 10 and includes a head (12) and a shank (14). While the present invention shows the head (12) as being a domed ceiling head, it should be recognized by those skilled in the art that this is merely one showing of a head form. Such a fastener, as contemplated by the present invention, can have a single head (12), as shown, or may include a multiplicity of axially spaced heads of the type normally used to fasten trim panels to automotive door interiors, not shown.

Figure 1:
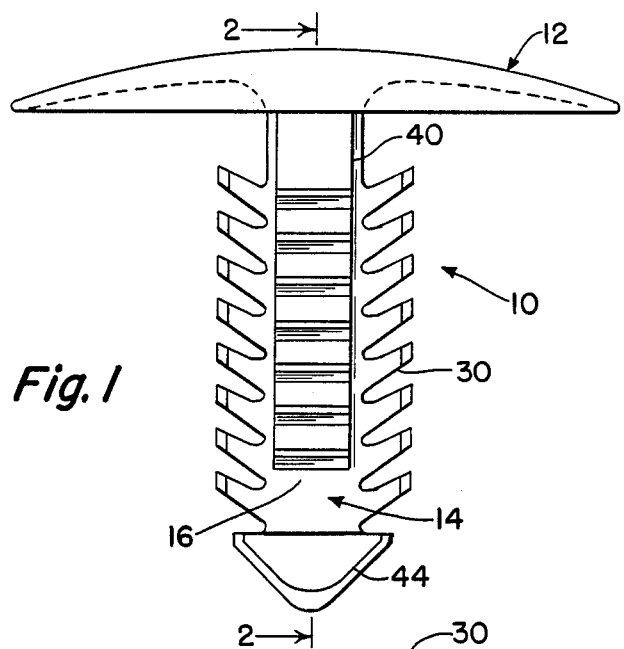
FIG. 1 is an elevational view of one embodiment of the present invention.
Figure 2:
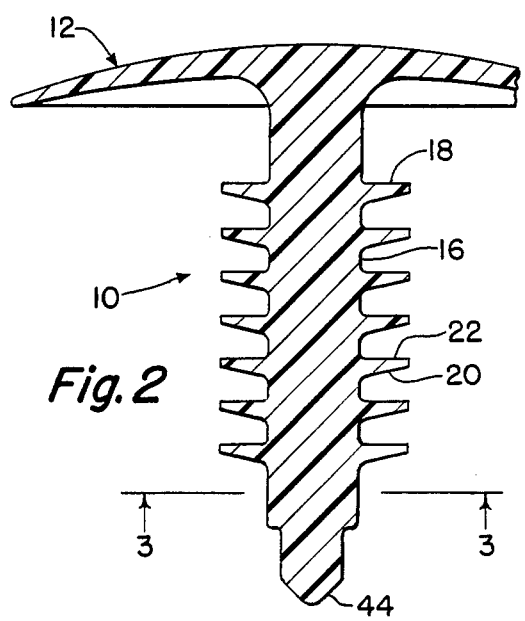
FIG. 2 is a cross-sectional view taken along line 2—2 of FIG. 1.
Figure 4:
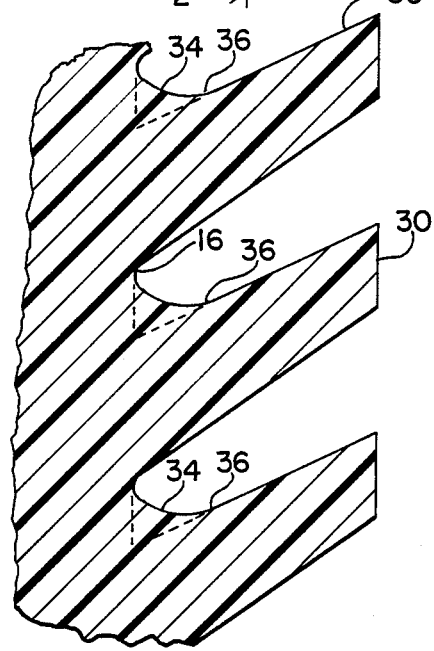
FIG. 4 is a fragmentary enlarged cross-sectional view of the improved wing portions of the present invention.
Figure 3:
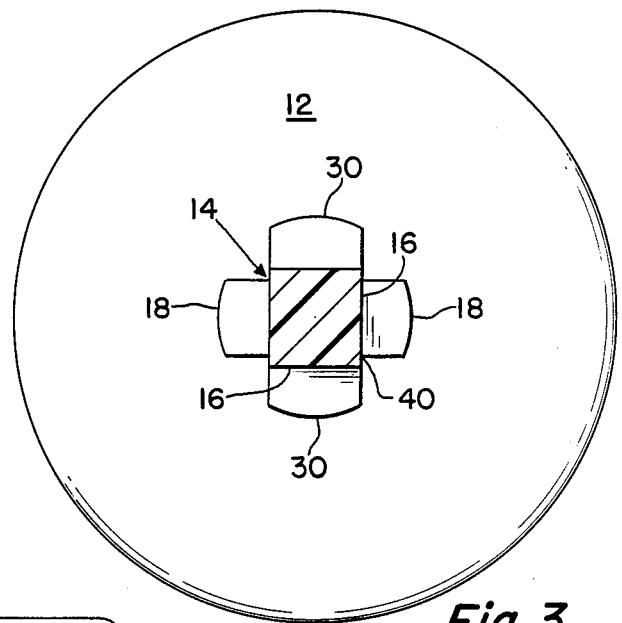
FIG. 3 is an end view taken from the entering end of FIG. 2.
Figure 5:
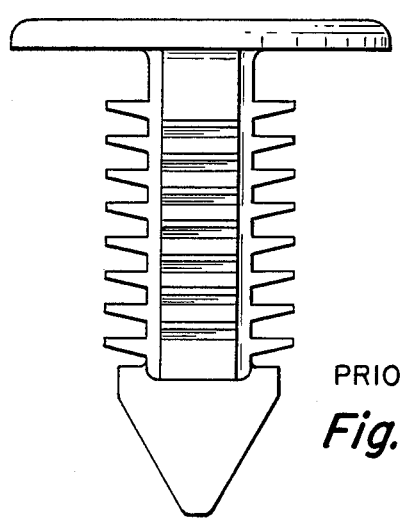
FIG. 5 is an elevational view of a prior art drive fastener.

The importance of the present invention relates to a plastic drive fastener which can be readily installed into an apertured panel or a bore within a thick panel in which the removal force is far in excess of the force of installation. An embodiment of such a fastener is shown in FIGS. 1 through 4, 7 and 8C. The shank (14) of such a fastener is generally non-circular or polygonal in configuration and provides a plurality of axially extending flat surfaces (16) which in the present embodiement are four in number, however, it should be appreciated that any equal number of flat surfaces will suffice. Extending outwardly from the flat surfaces (16) are a plurality of axially spaced flexible resilient wing elements (18) which are provided with a generally tapered undersurface (20) and a radially extending upper surface (22), as best seen in FIG. 2.

Figure 6:
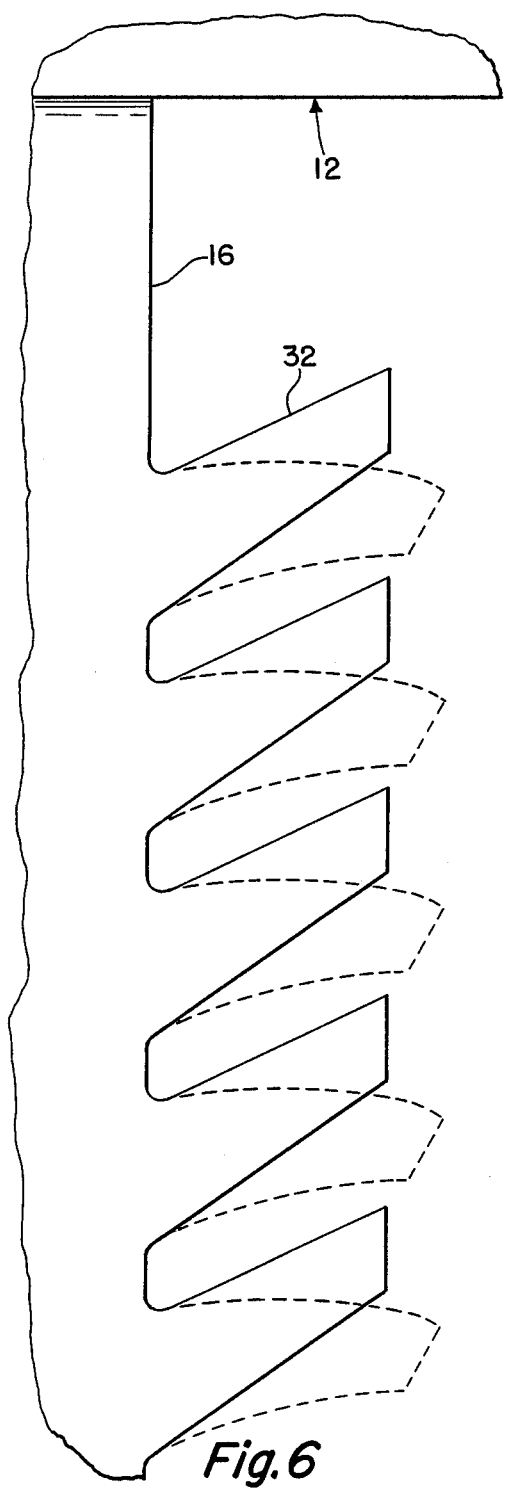
FIG. 6 is a fragmentary view of a drive fastener having angled wing elements without the improvement of the present invention.

Along at least one flat surface (18) are a plurality of certain resilient wing elements (30) which are angularly disposed relative to the axis of the shank (14) and tilt upwardly, as viewed in the drawing, toward the head (12). The initial development work of this fastener was to utilize a tilted wing, as seen in FIG. 6, which had substantially the same configuration as the flexible wing elements (18) that extend radially outwardly. As can be seen in FIG. 6 these elements generally designated (32) flexed along a straight line formed by their juncture with the flat surface (16). The insertion and removal forces of such items were slightly different.

Figure 7:
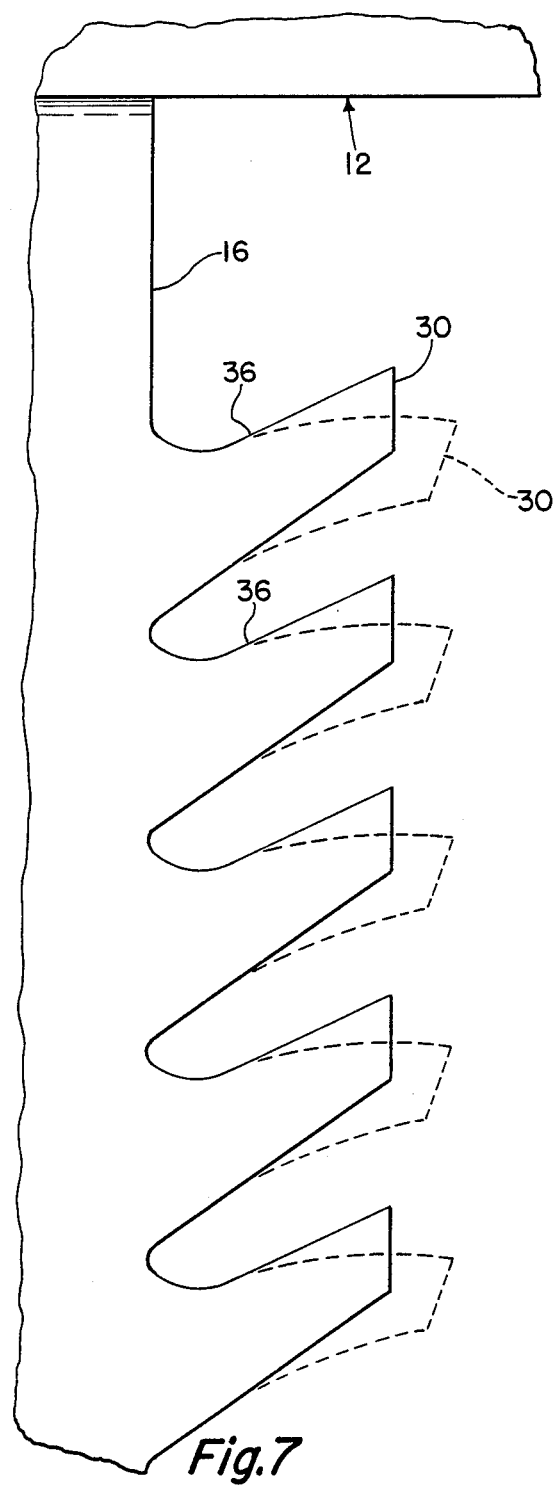
FIG. 7 is a fragmentary view of the present invention.
Figure 8A:
FIG. 8A is a schematic view of wing elements of the prior art.
Figure 8B:
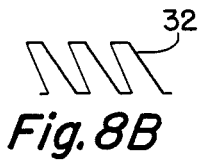
FIG. 8B is an intermediate development of the type shown in FIG. 6.
Figure 8C:
FIG. 8C is a schematic view of the present invention.

Further development resulted in the present embodiment shown in FIGS. 1 through 4 and FIG. 7 wherein a knuckle portion (34) is added to each of the angled wing elements (30) this results in the certain wing elements (30) having a bend line (36), as best seen in FIG. 7, which is generally parallel to surface (16) but radially spaced outwardly therefrom in essence, this creates a short stubby wing element (30) that can be readily inserted into an aperture or bore but which resists with great tenacity the removal of the fastener from the aperture or bore. Tests were conducted on various configurations of wings and the results of such tests are shown in pounds of force required to push the fastener in and to pull the fastener out. The figures are displayed in reference to the wing configurations shown in FIGS. 8A, 8B and 8C, the latter being the embodiment of the present invention. These test results are as follows:

| FIG. 8A | | FIG. 8B | | FIG. 8C | |
|---|---|---|---|---|---|
| IN | OUT | IN | OUT | IN | OUT |
| 24 | 32 | 10 | 18.5 | 30 | 75 |
| 21 | 23 | 11.5 | 14.5 | 35 | 75 |
| 20 | 23 | 11 | 16.5 | 20 | 70 |
| 19 | 22 | 10.5 | 13 | 25 | 80 |
| 24 | 21 | 10.5 | 15 | 25 | 82.5 |
| 22 | 21 | 10 | 14.5 | 35 | 65 |
| 22 | 23 | 10.5 | 12.5 | 25 | 87.5 |
| 22 | 20 | 10 | 12.5 | 20 | 75 |
| 21 | 19 | 10 | 12 | 22.5 | 75 |
| 20 | 18 | 10 | 12 | 27.5 | 72.5 |
| AVERAGES | | | | | |
| 21.5 | 22.2 | 10.4 | 14.1 | 23.8 | 75.8 |
| REMOVAL/INSERTION RATIOS | | | | | |
| 1.0 | | 1.4 | | 3.2 | |

As will be noted there is a dramatic unexpected result in the device of the present invention as shown in FIG. 8C.

In the present disclosure the improved form of resilient wing (30) with its knuckle portion (34) is shown extending in opposite directions from two of the flat wall surfaces (16) of the shank (14) with the radially extending wing element (18) occupying the other two flat opposed surfaces. It will be recognized that the amount of force removal can be controlled for a fastener of this design dependent upon the number of surfaces provided with knuckled angled wing elements (30). Wing elements (30) extending from one or more of the surfaces is all that is required, however, all of the surfaces can utilize such a wing element. Where wing elements (30) or (18) are extending from only one or two surfaces, now shown, it has been found desirable to provide means, such as an axially extending centering rib, not shown, to locate the fastener for optimum operating conditions relative to the cooperating aperture or bore.

While the present shank (14) includes four flat surfaces (16) it should be appreciated that the wing element (18) and (30) can extend from and cover the entire width of the flat surface or alternatively the shank (14) can include, if desired, a plurality of axially extending recesses (40) which interrupt and space adjacent flat surfaces for purposes of accepting an axially extending tool.

The nose portion (44) in the present embodiment is shown as an arrow-shaped member but it will be appreciated that other configurations are equally usable. The shank (16) can be blunt at the end, rounded, arrow-shaped, or pointed as may be desired.

Other embodiements of the present invention will be apparent to those skilled in the art.

We claim:
1. One-piece plastic drive fastener comprising a head and shank, said shank having an axially extending generally polygonal body portion providing a plurality of radial outward facing flat surfaces, a first plurality of integral independent resilient wings extending radially outwardly from at least one of said surfaces at axially spaced intervals, the juncture of said first plurality of said wings along said at least one of said surfaces being along a straight line forming a bend line for flexure of said wings during introduction of the fastener into a complementary aperture workpiece, a second plurality of integral resilient independent wings extending from one of the other of said surfaces with an angular orientation tilting in the direction of said head, each of said second plurality of wings having a thickened section formed on its upper surface at its juncture with said one surface, where said thickened section on the upper surface of each of said second plurality of wings extending the same distance from said one surface to define a bend line along which each wing flexes that is radially spaced from said one surface.

2. A fastener as defined in claim 1, further comprising said body portion having four sides in cross-section and said second plurality of angularly disposed wings being located along two opposed flat surfaces.

3. One-piece plastic drive fastener comprising a head and shank, said shank having an axially extending body portion with a cruciform cross-section to provide four radial outward facing flat surfaces, a first plurality of integral independent resilient wings extending radially outwardly from a first pair of opposed flat surfaces at axial spaced intervals, the juncture of said first plurality of said wings along both of said first pair of said opposed flat surfaces being along a straight line forming a bend line for flexure of said first plurality of wings during introduction of the fastener into a complementary aperture workpiece, a second plurality of integral independent resilient wings extending at axial spaced intervals from the second pair of opposed flat surfaces with an angular orientation tilting in the direction of said head, each of said second plurality of wings having a thickened section formed at its upper surface at its juncture with said second pair of flat surfaces where said thickened section on the upper surface of each of said second plurality of wings extends the same distance from said one surface to define a bend line radially spaced from said one of said other surfaces along which each wing flexes.

* * * * *